(12) United States Patent
Pandey et al.

(10) Patent No.: US 12,276,831 B2
(45) Date of Patent: Apr. 15, 2025

(54) ENLARGED MULTILAYER NITRIDE WAVEGUIDE FOR PHOTONIC INTEGRATED CIRCUIT

(71) Applicant: GlobalFoundries U.S. Inc., Malta, NY (US)

(72) Inventors: Shesh Mani Pandey, Saratoga Springs, NY (US); Yusheng Bian, Ballston Lake, NY (US); Ravi Prakash Srivastava, Clifton Park, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 270 days.

(21) Appl. No.: 18/058,967

(22) Filed: Nov. 28, 2022

(65) Prior Publication Data

US 2024/0176067 A1    May 30, 2024

(51) Int. Cl.
*G02B 6/12*     (2006.01)
*G02B 6/122*    (2006.01)
*G02B 6/136*    (2006.01)

(52) U.S. Cl.
CPC ......... *G02B 6/12004* (2013.01); *G02B 6/122* (2013.01); *G02B 6/1228* (2013.01); *G02B 6/136* (2013.01)

(58) Field of Classification Search
CPC .. G02B 6/12; G02B 6/12002; G02B 6/12004; G02B 6/13; G02B 6/131; G02B 6/132
See application file for complete search history.

(56) References Cited

U.S. PATENT DOCUMENTS

| 5,604,835 | A  | * | 2/1997 | Nakamura | G02B 6/12004 |
| | | | | | 385/132 |
| 6,775,453 | B1 | * | 8/2004 | Hornbeck | G02B 6/122 |
| | | | | | 385/129 |
| 7,010,208 | B1 | | 3/2006 | Gunn, III et al. | |
| 7,941,023 | B2 | | 5/2011 | Patel et al. | |
| 9,671,557 | B1 | | 6/2017 | Ding et al. | |
| 11,067,751 | B2 | | 7/2021 | Meagher et al. | |
| 2002/0021879 | A1 | * | 2/2002 | Lee | G02B 6/10 |
| | | | | | 385/124 |

(Continued)

OTHER PUBLICATIONS

Aboketaf et al., "Towards fully automated testing and characterization for photonic compact modeling on 300-mm wafer platform," W6A.1, OFC 2021, OSA 2021, 3 pages.

(Continued)

*Primary Examiner* — Michael Stahl
(74) *Attorney, Agent, or Firm* — Anthony Canale; Hoffman Warnick LLC

(57) ABSTRACT

Structures and methods implement an enlarged multilayer nitride waveguide. The structure may include an inter-level dielectric (ILD) layer over a substrate. A first enlarged multilayer nitride waveguide is positioned in the ILD layer in a region of the substrate. A second multilayer nitride waveguide may also be provided in the ILD layer. A lower cladding layer defines a lower surface of the nitride waveguide(s). The lower cladding layer has a lower refractive index than the nitride waveguide(s). Additional lower refractive index cladding layers can be provided on the upper surface and/or sidewalls of the nitride waveguide(s). The enlarged nitride waveguide may be implemented with other conventional silicon and nitride waveguides.

19 Claims, 10 Drawing Sheets

(56) References Cited

U.S. PATENT DOCUMENTS

| | | | | |
|---|---|---|---|---|
| 2004/0020895 | A1* | 2/2004 | Brask | G02B 6/136 216/24 |
| 2005/0211664 | A1* | 9/2005 | Khan | G02B 6/122 216/37 |
| 2007/0165992 | A1* | 7/2007 | Mouli | G02B 6/10 359/345 |
| 2008/0253728 | A1* | 10/2008 | Sparacin | B82Y 20/00 385/132 |
| 2017/0146740 | A1 | 5/2017 | Orcutt et al. | |
| 2019/0317282 | A1* | 10/2019 | Cho | G02B 6/12004 |
| 2019/0391328 | A1* | 12/2019 | Li | G02B 6/4274 |
| 2021/0396930 | A1* | 12/2021 | Chern | G02B 6/12004 |
| 2022/0099887 | A1 | 3/2022 | Yu et al. | |
| 2022/0128762 | A1 | 4/2022 | Bian et al. | |
| 2022/0196909 | A1* | 6/2022 | Holt | G02B 6/136 |
| 2024/0151899 | A1* | 5/2024 | Liu | G02F 1/025 |

OTHER PUBLICATIONS

Bian et al., "3D Integrated Laser Attach Technology on 300-mm Monolithic Silicon Photonics Platform," 978-1-7281-5891-4/20, IEEE 2020, 2 pages.

Bian et al., "Towards low-loss monolithic silicon and nitride photonic building blocks in state-of-the-art 300mm CMOS foundry," FW5D.2, Frontiers in Optics, Laser Science, OSA 2020, 2 pages.

Bian et al., "Monolithically integrated silicon nitride platform," Th1A.46, OFC 2021, OSA 2021, 3 pages.

Bian et al., "Hybrid III-V laser integration on a monolithic silicon photonic platform," M5A.2, OFC 2021, OSA 2021, 3 pages.

El Dirani et al., "Ultralow-loss tightly confining Si3N4 waveguides and high-Q microresonators," Optics Express, 27:30726-40, Oct. 2019, 15 pages.

Giewont et al., "300-mm Monolithic Silicon Photonics Foundry Technology," IEEE Journal of Selected Topics in Quantum Electronics, 25:8200611, Sep./Oct. 2019, 12 pages.

Peng et al., A CMOS Compatible Monolithic Fiber Attach Solution with Reliable Performance and Self-Alignment, Th31.4, OFC 2020, OSA 2020, 3 pages.

Rakowski et al., "45nm CMOS—Silicon Photonics Monolithic Technology (45CLO) for next-generation, low power and high speed optical interconnects," T3H.3, OFC 2020, OSA 2020, 3 pages.

European Search Report for corresponding EP Application No. 23201857.1-1020 dated Feb. 29, 2024, 5 pages.

* cited by examiner

ENLARGED MULTILAYER NITRIDE WAVEGUIDE FOR PHOTONIC INTEGRATED CIRCUIT

BACKGROUND

The present disclosure relates to photonic integrated circuits (PICs), and more specifically, to a structure with an enlarged multilayer nitride waveguide having a cladding layer having a lower refractive index than the nitride body of the waveguide on at least a lower surface of the waveguide.

Waveguides are used in PICs to direct optical signals where necessary. Waveguides may be made of, for example, semiconductor material such as silicon, or nitride material such as silicon nitride. The waveguides are made relatively vertically short, e.g., less than 300 nanometers thick, for integration with other integrated circuit devices such as complementary metal-oxide semiconductor (CMOS) transistor devices. Silicon waveguides are typically made in layers with other silicon active regions, and nitride waveguides are made in layers above the silicon layers. Propagation losses in certain waveguides can be too high for many applications. One way to reduce the propagation losses is to enlarge the waveguides. Larger waveguides, e.g., having a thickness of greater than 500 nanometers, have been applied to monolithic PIC platforms by extending them into a buried insulator layer of a semiconductor-on-insulator (SOI) substrate. However, the larger waveguides still exhibit unsatisfactory propagation losses, especially between nitride waveguides and single-mode optical fibers.

SUMMARY

Aspects of the disclosure are directed to a structure, comprising: an inter-level dielectric (ILD) layer over a substrate; and a first multilayer nitride waveguide positioned in the ILD layer in a first region of the substrate, the first multilayer nitride waveguide including: a first nitride body, and a first cladding layer on at least a lower surface of the first nitride body, wherein the first cladding layer has a lower refractive index than the first nitride body.

Further aspects of the disclosure include a structure, comprising: a semiconductor-on-insulator (SOI) substrate including a semiconductor-on-insulator (SOI) layer over a buried insulator layer over a semiconductor substrate; an inter-level dielectric (ILD) layer over the SOI substrate; a first multilayer nitride waveguide positioned in the ILD layer in a first region of the SOI substrate, the first multilayer nitride waveguide including a first nitride body, and a first cladding layer on at least a lower surface of the first nitride body, wherein the first cladding layer has a lower refractive index than the first nitride body; and a second multilayer nitride waveguide in the ILD layer in the first region of the SOI substrate, wherein the first and second multilayer nitride waveguides are optically side-coupled to one another, the second multilayer nitride waveguide including a second nitride body, and the first cladding layer on at least a lower surface of the second nitride body, wherein the first cladding layer has a lower refractive index than the second nitride body.

Still further aspects of the disclosure relate to a method of forming a waveguide structure, the method comprising: forming a trench through an inter-level dielectric (ILD) layer in a first region of a substrate under the ILD layer; forming a first cladding layer and a nitride layer over the first cladding layer within the trench and over the ILD layer; planarizing an upper surface of the nitride layer; forming a first multilayer nitride waveguide by patterning the first cladding layer and the nitride layer within the trench to form a first nitride body having the first cladding layer thereunder, wherein the first cladding layer has a lower refractive index than the first nitride body.

The foregoing and other features of the disclosure will be apparent from the following more particular description of embodiments of the disclosure.

BRIEF DESCRIPTION OF THE DRAWINGS

The embodiments of this disclosure will be described in detail, with reference to the following figures, wherein like designations denote like elements, and wherein.

Figure 1:
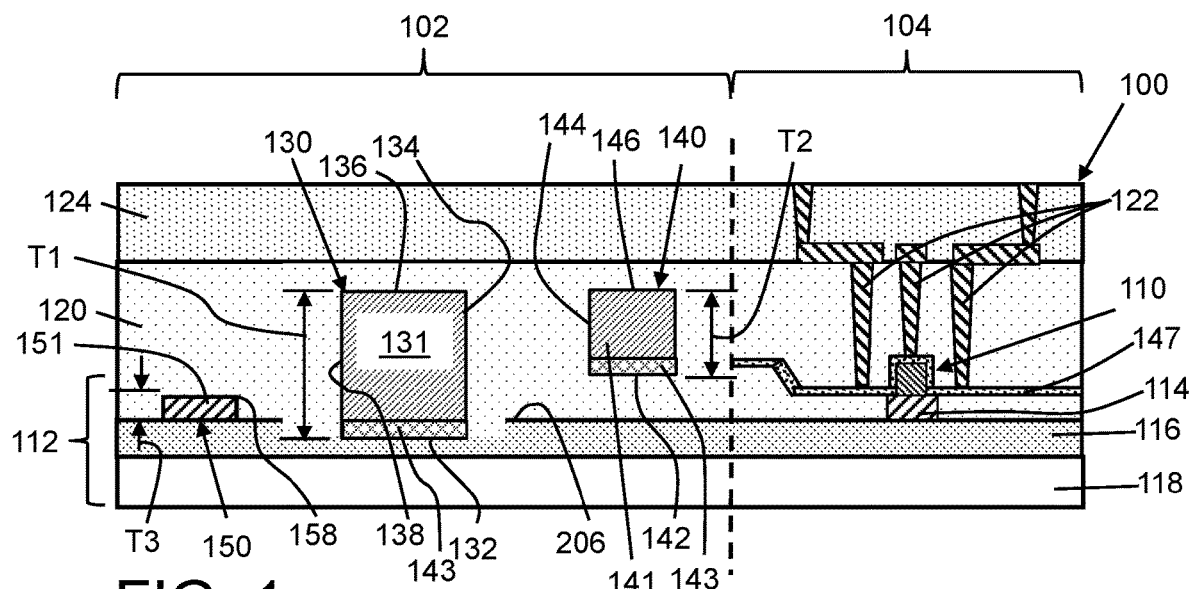
FIG. 1 shows a cross-sectional view of a waveguide structure, according to embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific illustrative embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

It will be understood that when an element such as a layer, region, portion, or substrate is referred to as being "on" or "over" another element, it may be directly on the other element or intervening elements may also be present. In contrast, when an element is referred to as being "directly on" or "directly over" another element, there may be no intervening elements present. It will also be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. As used herein, waveguides being "optically coupled" indicates that the waveguides are structurally positioned and/or arranged to allow optical signals to be transmitted therebetween. More specifically, "optically side-coupled" or "side-coupled" indicates that the waveguides are structurally positioned and/or arranged laterally (with at least some vertical overlap) to allow optical signals to be transmitted laterally therebetween, i.e., through sides thereof.

Reference in the specification to "one embodiment" or "an embodiment" of the present disclosure, as well as other variations thereof, means that a particular feature, structure, characteristic, and so forth described in connection with the embodiment is included in at least one embodiment of the present disclosure. Thus, the phrases "in one embodiment" or "in an embodiment," as well as any other variations appearing in various places throughout the specification are not necessarily all referring to the same embodiment. It is to be appreciated that the use of any of the following "/," "and/or," and "at least one of," for example, in the cases of "A/B," "A and/or B" and "at least one of A and B," is intended to encompass the selection of the first listed option (a) only, or the selection of the second listed option (B) only, or the selection of both options (A and B). As a further example, in the cases of "A, B, and/or C" and "at least one of A, B, and C," such phrasing is intended to encompass the first listed option (A) only, or the selection of the second listed option (B) only, or the selection of the third listed option (C) only, or the selection of the first and the second listed options (A and B), or the selection of the first and third listed options (A and C) only, or the selection of the second and third listed options (B and C) only, or the selection of all three options (A and B and C). This may be extended, as readily apparent by one of ordinary skill in the art, for as many items listed.

Embodiments of the disclosure provide structures and methods having an enlarged multilayer nitride waveguide. A first enlarged multilayer nitride waveguide (e.g., greater than 500 nanometers (nm) thick) is positioned in an ILD layer in a region of a substrate. Conventional nitride waveguides are smaller sized, e.g., less than approximately 300 nanometers. A second, smaller multilayer nitride waveguide may also be provided in the ILD layer. Each multilayer nitride waveguide includes a nitride body and a lower cladding layer on at least a lower surface of the respective nitride body. The cladding layer has a lower refractive index than the nitride bodies. Additional lower refractive index cladding layers can be provided on the upper surface and/or sidewalls of the nitride bodies. The enlarged multilayer nitride waveguide may be implemented with other conventional silicon and/or multilayer nitride waveguides. The enlarged multilayer nitride waveguide with low refractive index cladding layer(s) improves propagation losses and allows changing of the mode shape within the waveguide. The cladding layer(s) also reduce propagation losses and allow shorter directional coupling (relaxing fabrication requirements) between the waveguides. The multilayer nitride waveguides further enable monolithic integration of ultra-low-loss, large-size multilayer nitride waveguides with, for example, silicon waveguides and CMOS devices, allowing full realization of the benefit of ultra-low-loss nitride devices and photonic integrated circuits. The enlarged multilayer nitride waveguide is also less sensitive to fabrication variations than existing single layer nitride waveguides and can handle higher optical power.

FIG. 1 shows a cross-sectional view of a structure 100 according to embodiments of the disclosure. Structure 100 includes a first region 102 in which waveguides according to embodiments of the disclosure are provided, and a second region 104 in which a complementary metal-oxide semiconductor (CMOS) device 110 is positioned. Structure 100 may also be referred to herein as a waveguide structure or a photonic integrated circuit (PIC), i.e., an integrated circuit with optical functions.

Structure 100 is illustrated as including a substrate 112 in the form of a semiconductor-on-insulator (SOI) substrate including a semiconductor-on-insulator (SOI) layer 114 over a buried insulator layer 116 over a semiconductor substrate 118. Some or all of SOI layer 114 may be omitted in first region 102. SOI layer 114 and semiconductor substrate 118 may include but are not limited to silicon, germanium, silicon germanium, silicon carbide, and those consisting essentially of one or more III-V compound semiconductors. Buried insulator layer 116 may include any appropriate dielectric material such as but not limited silicon oxide ($SiO_2$). While shown as an SOI substrate, substrate 112 may include any other form of semiconductor substrate, e.g., a bulk semiconductor substrate.

Structure 100 includes an inter-level dielectric (ILD) layer 120 over substrate 112. Suitable dielectric materials for ILD layer 120 include but are not limited to: carbon-doped silicon oxide materials; fluorinated silicate glass (FSG); organic polymeric thermoset materials; silicon oxycarbide; SiCOH dielectrics; fluorine doped silicon oxide; spin-on glasses; silsesquioxanes, including hydrogen silsesquioxane (HSQ), methyl silsesquioxane (MSQ) and mixtures or copolymers of HSQ and MSQ; benzocyclobutene (BCB)-based polymer dielectrics, and any silicon-containing low-k dielectric. In one non-limiting example, ILD layer 120 includes one or more variations of silicon oxide ($SiO_2$).

CMOS device 110 may include any now known or later developed integrated circuit structure(s) that would be integrated with photonics, such as but not limited to: transistors, trans-impedance amplifiers (TIA), drivers or passive devices (e.g., a resistor, capacitor or other passive element). CMOS device 110 may be formed using any now known or later developed semiconductor fabrication techniques. CMOS device 110 is in second region 104 of substrate 112. ILD layer 120 is over CMOS device 110 and includes interconnects 122 to CMOS device 110. Interconnects 122 may include any now known or later developed metal wire or contact. Any number of additional ILD layer(s) 124 may also be provided over ILD layer 120 in a known fashion, i.e., providing back-end-of-line (BEOL) interconnect layers.

Structure 100 also includes a first multilayer nitride waveguide 130 (hereafter "first nitride waveguide 130") positioned in ILD layer 120 in first region 102 of SOI substrate 112. First nitride waveguide 130 includes a first nitride body 131. A lower surface 132 of first nitride waveguide 130 may be located in substrate 112 to allow it to be thicker. For example, first nitride waveguide 130 may extend at least partially into buried insulator layer 116. Hence, first nitride waveguide 130 may extend into upper portion 206 of buried insulator layer 116. In one non-limiting example, first nitride waveguide 130 may extend into buried insulator layer 0.02-0.5 micrometers (μm) for a 2 μm thick buried insulator layer 116. Other dimensions may be possible depending on a desired size of first nitride waveguide 130. First nitride body 131 may include a nitride material such as silicon nitride ($Si_3N_4$).

Structure 100 may also optionally include a second multilayer nitride waveguide 140 (hereafter "second nitride waveguide 140") in ILD layer 120 in first region 102 of SOI substrate 112. Second nitride waveguide 140 includes a second nitride body 141. In contrast to first nitride waveguide 130, second nitride waveguide 140 includes a lower surface 142 above substrate 112, i.e., in ILD layer 120 and above buried insulator layer 116. As illustrated, first and second nitride waveguides 130, 140 overlap vertically, allowing sidewalls 134, 144, respectively, thereof to be optically side-coupled. Second nitride body 141 includes a nitride material such as silicon nitride ($Si_3N_4$). Hence, although not necessary in all instances, second nitride body 141 may include the same material as first nitride body 131.

As shown in FIG. 1, structure 100 also includes a lower cladding layer 143 defining at least a lower surface 132 of first nitride waveguide 130, i.e., lower cladding layer 143 is on a lower surface of first nitride body 131 and defines a lower surface 132 of first nitride waveguide 130. Lower cladding layer 143 may also be on a lower surface of second nitride body 141 to define a lower surface 142 of second nitride waveguide 140. That is, lower cladding layer 143 may define a lower surface 132, 142 of first nitride waveguide 130 and second nitride waveguide 142. In any event, lower cladding layer 143 has a lower refractive index than first nitride body 131 and second nitride body 141 (where latter provided). Nitride bodies 131, 141 may have refractive index of, for example, approximately 2.0. Lower cladding layer 143 may be one or more of the following: zinc monoxide (ZnO), n=1.9318 @1.31 micrometers (μm), n=1.9267 @1.55 μm; aluminum oxide ($Al_2O_3$), n=1.7503 @1.31 μm, n=1.7462 @1.55 μm; magnesium oxide (MgO), n=1.7178 @1.31 μm, n=1.7146 @1.55 μm; silicon dioxide ($SiO_2$), n<1.6, n=1.45 @1.31 μm; calcium fluoride ($CaF_2$), n=1.4272 @1.31 μm, n=1.4260 @1.55 μm; octamethylcyclotetrasiloxane (OMCTS) [$(CH_3)_2SiO]_4$ (SiCOH), n=1.406 @1.31 μm; and magnesium fluoride ($MgF_2$), n=1.3718 @1.31 μm, n=1.3705 @1.55 μm. Collectively, nitride bodies 131, 141 and lower cladding layer 143 make a respective multilayer waveguide 130, 140.

As shown in FIG. 1, first nitride waveguide 130 and second nitride waveguide 140 have different thicknesses. More particularly, first nitride body 131 of first nitride waveguide 130 and second nitride body 141 of second nitride waveguide 140 have different thicknesses. Lower cladding layer 143 may have the same or different thickness on each waveguide 130, 140. In the example shown, first nitride waveguide 130 has a larger vertical extent, i.e., thickness T1, than second nitride waveguide 140, i.e., thickness T2. Hence, first nitride waveguide 130 is enlarged compared to second nitride waveguide 140. Second nitride waveguide 140 may have a thickness T2 that is similar to conventional nitride waveguides, e.g., less than 500 nm, and perhaps less than 300 nm. Although not shown in FIG. 1 for clarity in first region 102, first and second nitride waveguide 130, 140 may extend through a nitride cap 147 that would normally separate portions of ILD layer 120, e.g., over trench isolations, etc., in first region 102. Consequently, since second nitride waveguide 140 may extend below nitride cap 147, it also may be made slightly thicker than conventional nitride waveguides, where desired. First nitride waveguide 130 may have a thickness T1 of, in one embodiment of greater than 500 nm, and in other embodiments, may have a thickness T1 of approximately 500-1000 nm. First nitride waveguide 130 and second nitride waveguide 140 may have upper surfaces 136, 146, respectively, that are coplanar. That is, they are at the same height within ILD layer 120. The height with ILD layer 120 is such that lengthening of interconnects 122 to, for example, CMOS devices 110, is not necessary. In this manner, enlarged first nitride waveguide 130 can be provided without impacting contact resistance and overall performance of the PIC.

Structure 100 may also optionally include a third waveguide 150 in ILD layer 120 in first region 102 of SOI substrate 112. In contrast to first and second nitride waveguides 130, 140, third waveguide 150 may include a silicon body 151. Hence, first nitride waveguide 130 and second nitride waveguide 140 may include a different material than third waveguide 150. For example, first and second nitride waveguides 130, 140 may include nitride body material, and third waveguide 150 may include silicon body material. As illustrated, due to the increased thickness of first nitride waveguide 130, first and third waveguides 130, 150 overlap vertically, allowing sidewalls 138, 158, respectively, thereof to optically side-couple the waveguides. Hence, optical signals can be optically transmitted in a vertical direction in structure 100. Third waveguide 150 may have a thickness T3 that is similar to conventional silicon waveguides, e.g., less than 300 nm. Although not shown for clarity, third waveguide 150 may be below nitride cap 147 in first region 102.

Figure 2:
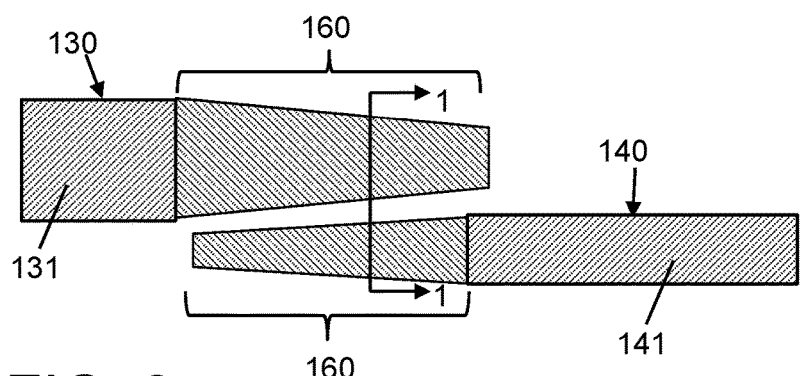
FIG. 2 shows a top-down view of a waveguide structure including an enlarged multilayer nitride waveguide and another multilayer nitride waveguide, according to embodiments of the disclosure.
Figure 3:
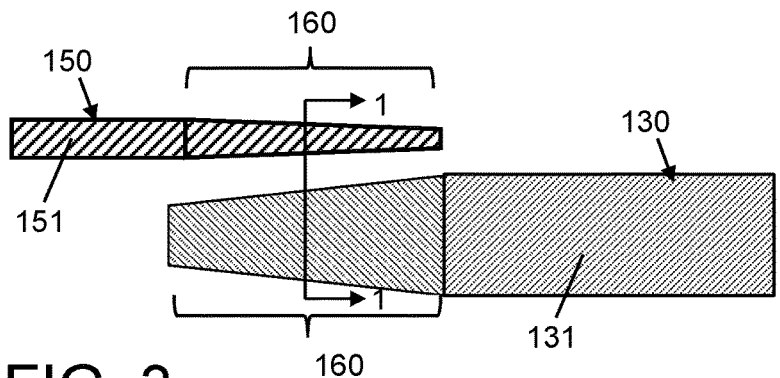
FIG. 3 shows a top-down view of a waveguide structure including an enlarged multilayer nitride waveguide and a silicon waveguide, according to embodiments of the disclosure.

FIG. 2 shows a top-down view of first and second nitride waveguides 130, 140 (partially) showing the cross-sectional view line for FIG. 1; and FIG. 3 shows a top-down view of first and third waveguides 130, 150 (partially) showing the cross-sectional view line for FIG. 1. As shown in FIGS. 2 and 3, at least one of the first, second and third waveguides 130, 140, 150 may include a portion having a laterally tapering dimension. That is, waveguides 130, 140, 150 may include tapered portions 160 that taper into or out of the page of FIG. 1. While shown as linear tapers, the tapers may also be non-linear. The rest of waveguides 130, 140, 150 outside the tapered portions 160 may have parallel sides. Optical signals may move left-to-right or right-to-left in FIGS. 2 and 3. In addition, optical signals can move vertically within first nitride waveguide 130.

While a particular positioning of waveguides 130, 140, 150 has been illustrated in FIGS. 1-3, it is emphasized that the positioning may vary, e.g., with enlarged nitride waveguide 130 in another position, or one or more additional waveguides 130, 140, 150 present. Any number of waveguides 130, 140, 150 may be employed, and each may have different dimensions, if desired. Although not shown in FIGS. 2-3, as will be apparent from the description, cladding layers (e.g., 148, 248 in FIGS. 4-7 and 348 in FIGS. 6-7) may also be positioned on upper or sidewall surfaces of nitride bodies 131 and/or 141.

Figure 4:
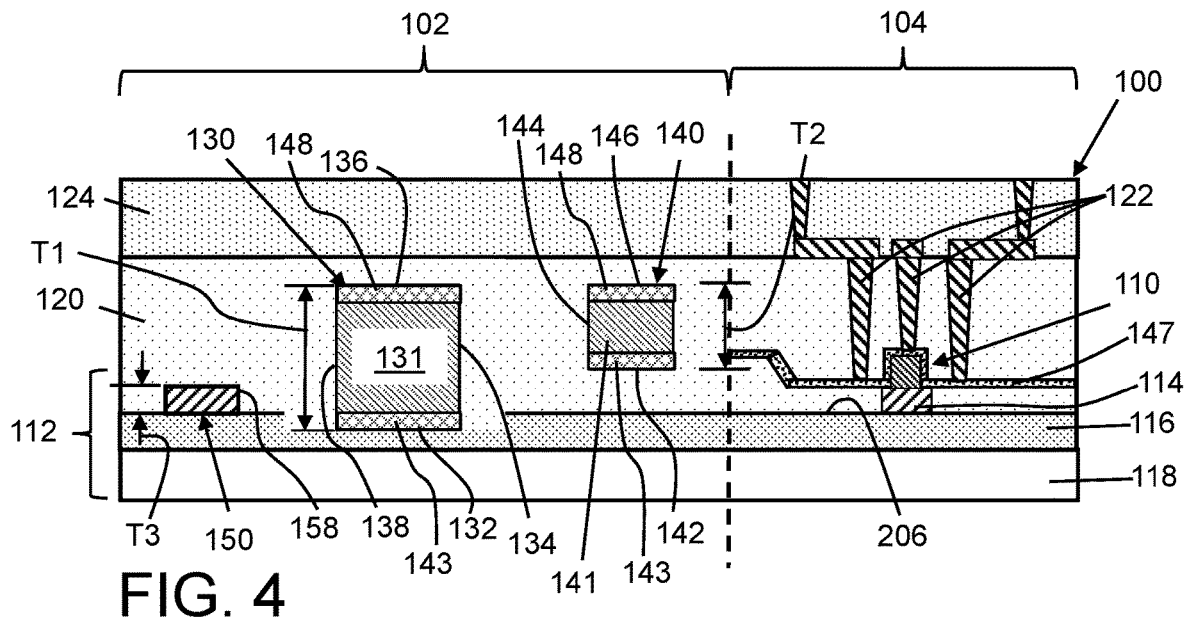
FIG. 4 shows a cross-sectional view of a waveguide structure, according to other embodiments of the disclosure.
Figure 5:
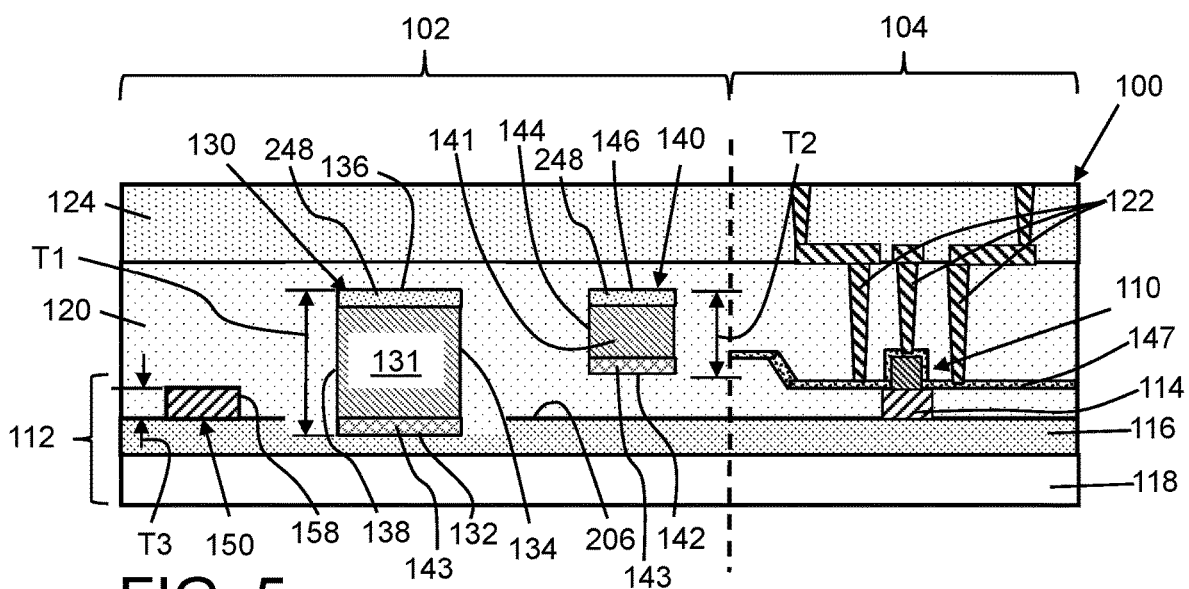
FIG. 5 shows a cross-sectional view of a waveguide structure, according to other embodiments of the disclosure.

FIG. 4 shows a cross-sectional view of a structure 100 according to other embodiments of the disclosure. In FIG. 4, an upper cladding layer 148 on an upper surface of first nitride body 131 and second nitride body 141 define an upper surface 136, 146 of first nitride waveguide 130 and, where provided, second nitride waveguide 140, respectively. Upper cladding layer 148 has a lower refractive index than the first and second nitride bodies 131, 141 and is of the same material lower cladding layer 143. In FIG. 5, an upper cladding layer 248 on an upper surface of first nitride body 131 and second nitride body 141 define an upper surface 136, 146 of first nitride waveguide 130 and, where provided, second nitride waveguide 140, respectively. Upper cladding layer 248 has a lower refractive index than the first and second nitride bodies 131, 141, but is of a different material than lower cladding layer 143. Here, upper cladding layer 248 may include any of the materials previously listed herein for lower cladding layer 143 but is different than lower cladding layer 143.

Figure 6:
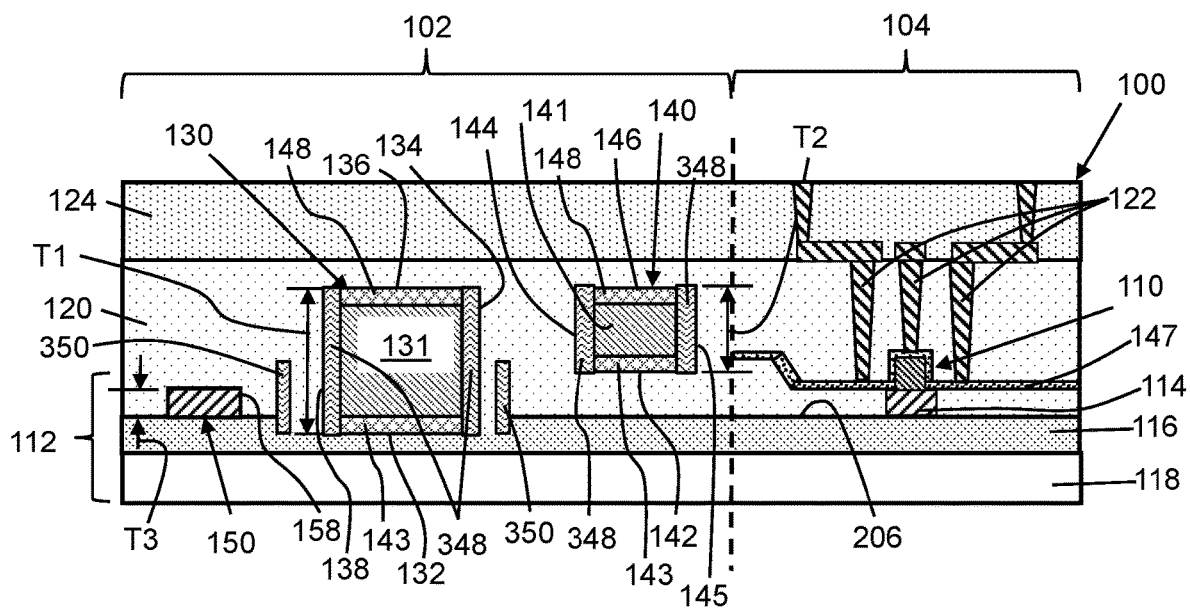
FIG. 6 shows a cross-sectional view of a waveguide structure, according to other embodiments of the disclosure.
Figure 7:
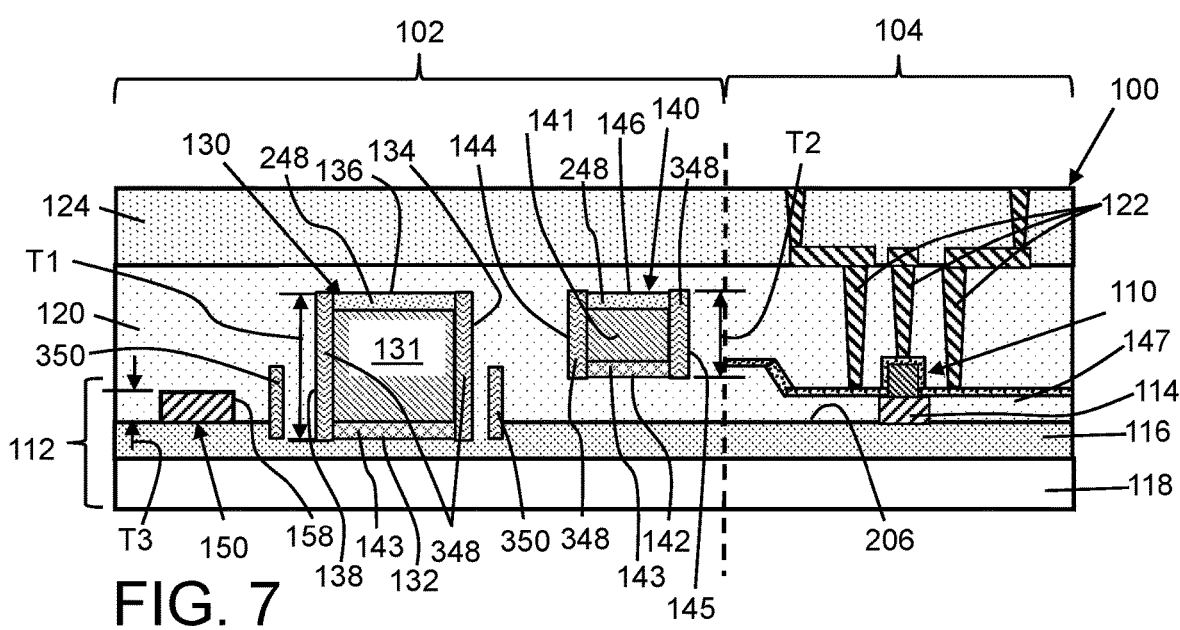
FIG. 7 shows a cross-sectional view of a waveguide structure, according to other embodiments of the disclosure.

FIGS. 6 and 7 show cross-sectional views of structure 100 according to additional embodiments of the disclosure. In FIGS. 6-7, structure 100 also includes a side cladding layer 348 on at least one of a sidewall 134, 138 of first nitride body 131 and a sidewall 144, 145 of second nitride body 141. Side cladding layer 348 has a lower refractive index than first and second nitride bodies 131, 141, and is of a different material than lower cladding layer 143 and any upper cladding layer 148 or 248. Side cladding layer 348 may include any of the materials previously listed herein for lower cladding layer 143, but is different than lower cladding layer 143 and any upper cladding layer 148 or 248. Structure 100 may also include at least one segment 350 of side cladding layer 348 laterally spaced from lower surface 132 of first nitride waveguide 130. Segment(s) 350 are remnants of a cladding material layer used to make side cladding layer 348, as will be described herein.

Figure 8:
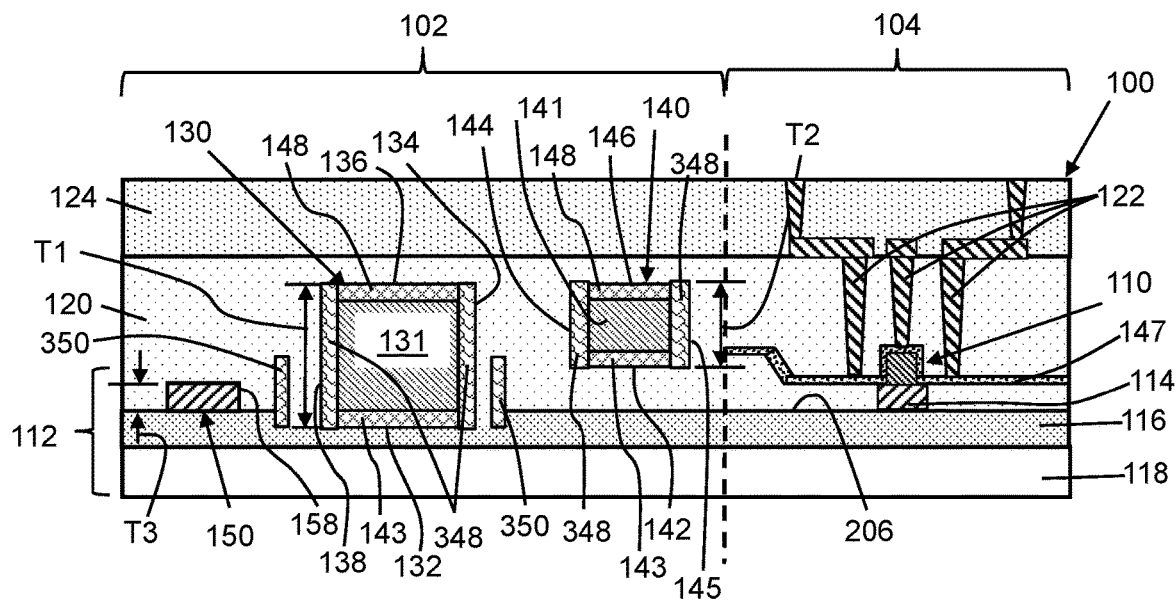
FIG. 8 shows a cross-sectional view of a waveguide structure, according to other embodiments of the disclosure.

FIG. 8 show cross-sectional views of structure 100 according to an additional embodiment of the disclosure. In FIG. 8, structure 100 also includes side cladding layer 348 on at least one of sidewall 134, 138 of first nitride body 131 and sidewall 144, 145 of second nitride body 141. Side cladding layer 348 has a lower refractive index than first and second nitride bodies 131, 141. In FIG. 8, side cladding layer 348 is the same material as lower cladding layer 143 and any upper cladding layer 148. That is, all three cladding layers 143, 148 and 348 about nitride bodies 131 or 142, are of the same material. The cladding layers 143, 148, 348 may include any of the materials previously listed herein for lower cladding layer 143. Structure 100 may also include at least one segment 350 of cladding layer material (348) laterally spaced from lower surface 132 of first nitride waveguide 130. Segment(s) 350 are remnants of a cladding material layer used to make side cladding layer 348.

Figure 9:
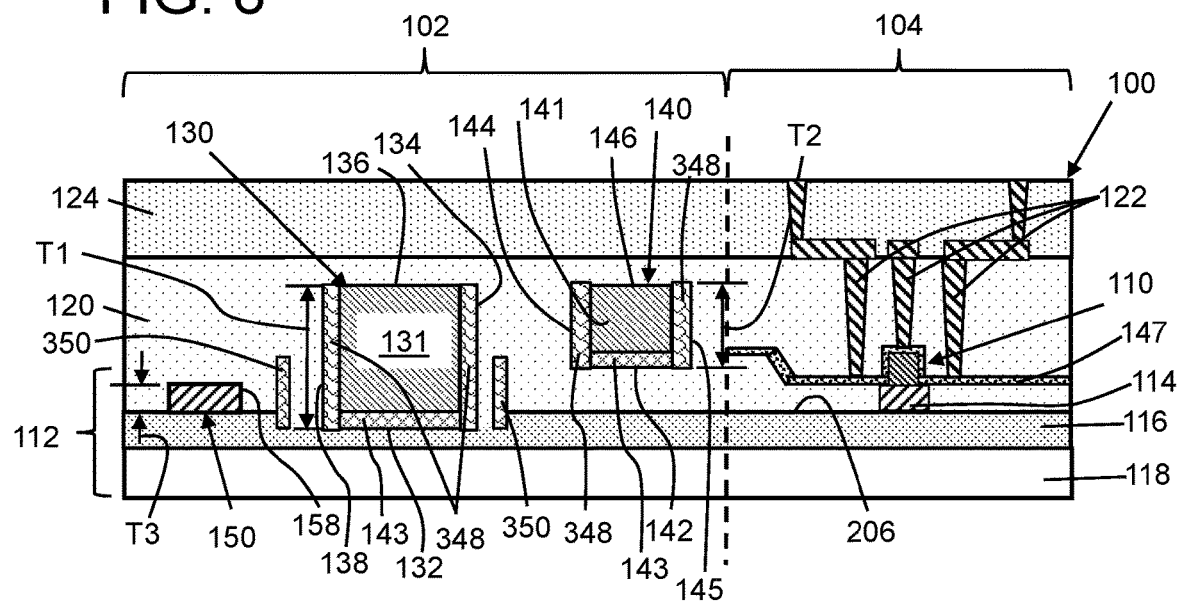
FIG. 9 shows a cross-sectional view of a waveguide structure, according to other embodiments of the disclosure.

FIG. 9 show cross-sectional views of structure 100 according to an additional embodiment of the disclosure. In FIG. 9, structure 100 also includes side cladding layer 348 on at least one of sidewall 134, 138 of first nitride body 131 and sidewall 144, 145 of second nitride body 141, but second cladding layer 148, 248 on top of bod(ies) 131, 141 is omitted. Side cladding layer 348 has a lower refractive index than first and second nitride bodies 131, 141. In FIG. 9, side cladding layer 348 is the same material as lower cladding layer 143, but that is not necessary in all cases. Cladding layers 143, 348 may include any of the materials previously listed herein for lower cladding layer 143. Structure 100 may also include at least one segment 350 of cladding layer material (348) laterally spaced from lower surface 132 of first nitride waveguide 130. Segment(s) 350 are remnants of a cladding material layer used to make side cladding layer 348.

While various versions of material combinations of cladding layers 143, 148, 248, 348 have been described herein, the layers about cladding layer 143, 148, 248, 348, i.e., ILD layers 120, 124, are different material than the cladding layers.

FIGS. 10-21 show cross-sectional views of forming structure 100, according to various embodiments of the disclosure. Structure 100, including waveguides 130, 140, 150, may be formed in a number of ways, and the disclosed embodiments are just one illustrative approach.

Figure 10:
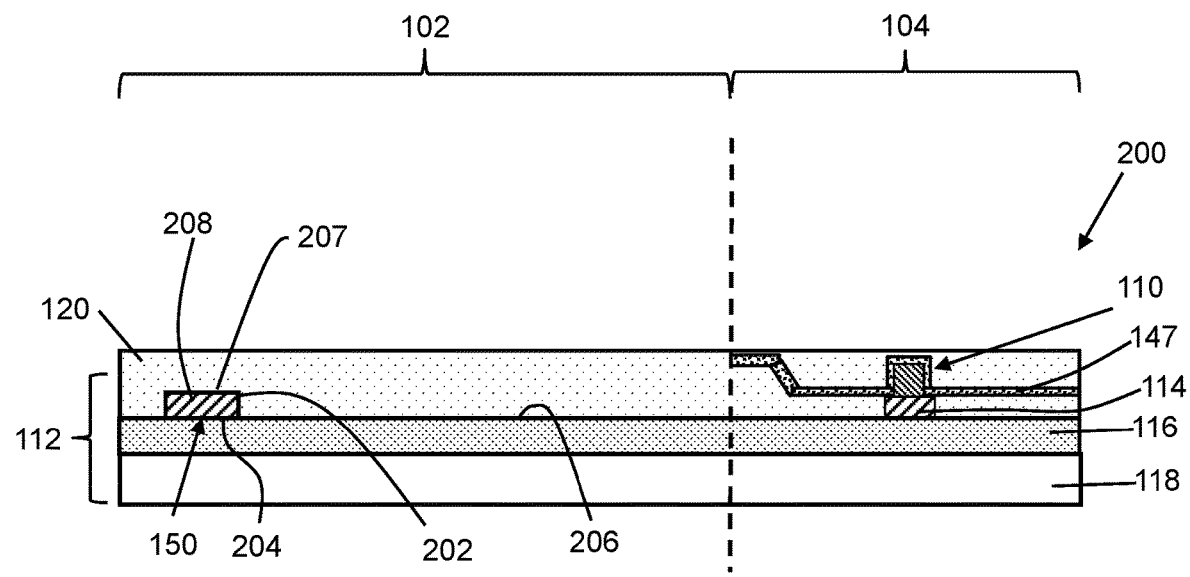
FIG. 10 shows a cross-sectional view of a preliminary structure for methods of forming a waveguide structure, according to embodiments of the disclosure.

FIG. 10 shows a cross-sectional view of a preliminary structure 200. Preliminary structure 200 includes substrate 112 with CMOS 110 formed in second region 104 of SOI substrate 112, as noted herein. CMOS device 110 may be formed partially in, for example, SOI layer 114 of substrate 112 (when SOI used) in second region 104 of substrate 112, using any now known or later developed techniques. ILD layer 120 is formed over CMOS device 110 and may be part of a middle-of-line (MOL) layer including interconnects 122 (FIG. 1) (formed later) to CMOS device 110.

ILD layer 120 may be formed by deposition. "Depositing" may include any now known or later developed techniques appropriate for the material to be deposited including but are not limited to, for example: chemical vapor deposition (CVD), low-pressure CVD (LPCVD), plasma-enhanced CVD (PECVD), semi-atmosphere CVD (SACVD) and high density plasma CVD (HDPCVD), rapid thermal CVD (RTCVD), ultra-high vacuum CVD (UHVCVD), limited reaction processing CVD (LRPCVD), metalorganic CVD (MOCVD), sputtering deposition, ion beam deposition, electron beam deposition, laser assisted deposition, thermal oxidation, thermal nitridation, spin-on methods, physical vapor deposition (PVD), atomic layer deposition (ALD), chemical oxidation, molecular beam epitaxy (MBE), plating, evaporation. Here, ILD layer 120 may be formed by CVD, for example.

Third waveguide 150 may be formed prior to forming first nitride waveguide 130 and from SOI layer 114, e.g., by patterning SOI layer 114 to create the waveguide. Alternatively, third waveguide 150 may be formed, prior to forming first nitride waveguide 130, by: forming a trench 202 in ILD layer 120 in first region 102 of SOI substrate 112, forming a silicon layer 208 within trench 202, and planarizing an upper surface 207 of silicon layer 208. As described herein, trenches (including trench 202) may be formed using any now known or later developed opening forming technique such as photolithography and patterning techniques, e.g., depositing a photoresist (not shown) on a layer, exposing the photoresist to light in a specified pattern, etching the photoresist to form a mask, etching the layer (e.g., ILD layer 120) using the mask, and then removing the mask. It is noted that lower surface 204 of trench 202 is above an upper portion 206 of buried insulator layer 116. Consequently, third waveguide 150 does not extend into buried insulator layer 116. Silicon layer 208 may be deposited using any appropriate technique. Here, silicon layer 208 may be formed by ALD, for example.

Etching generally refers to the removal of material from a substrate (or structures formed on the substrate), and is often performed with a mask in place so that material may selectively be removed from certain areas of the substrate, while leaving the material unaffected, in other areas of the substrate. There are generally two categories of etching, (i) wet etch and (ii) dry etch. Wet etch is performed with a solvent (such as an acid) which may be chosen for its ability to selectively dissolve a given material (such as oxide), while, leaving another material (such as polysilicon) relatively intact. This ability to selectively etch given materials is fundamental to many semiconductor fabrication processes. A wet etch will generally etch a homogeneous material (e.g., oxide) isotropically, but a wet etch may also etch single-crystal materials (e.g., silicon wafers) anisotropically. Dry etch may be performed using a plasma. Plasma systems can operate in several modes by adjusting the parameters of the plasma. Ordinary plasma etching produces energetic free radicals, neutrally charged, that react at the surface of the wafer. Since neutral particles attack the wafer from all angles, this process is isotropic. Ion milling, or sputter etching, bombards the wafer with energetic ions of noble gases, which approach the wafer approximately from one direction, and therefore this process is highly anisotropic. Reactive-ion etching (RIE) operates under conditions intermediate between sputter and plasma etching and may be used to produce deep, narrow features, such as trenches 202, 210, etc.

Figure 11:
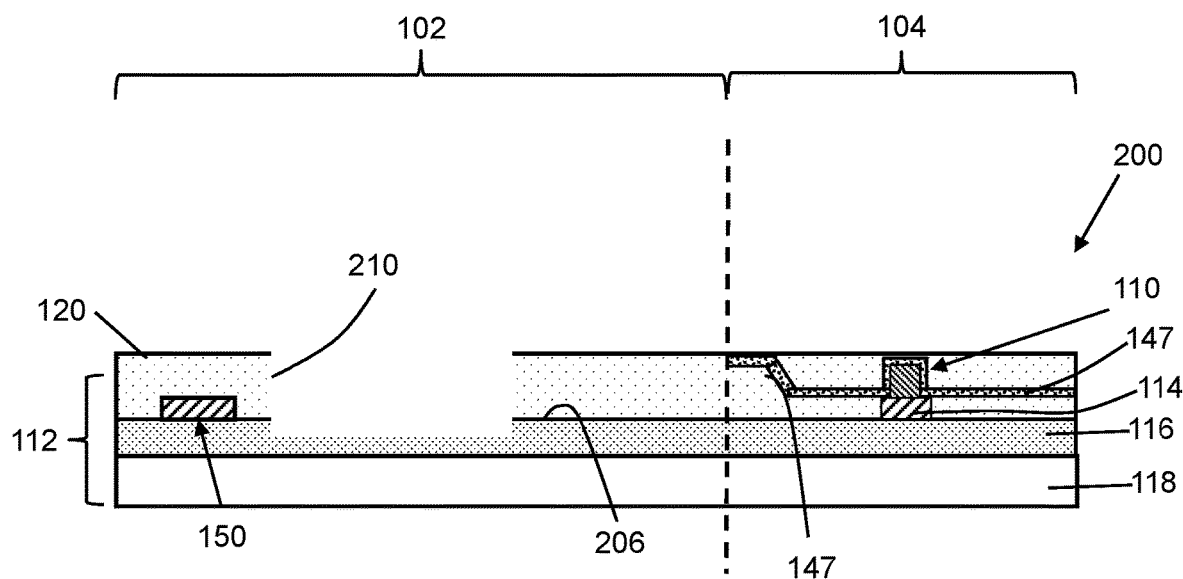
FIG. 11 shows a cross-sectional view of forming a trench for a first enlarged multilayer nitride waveguide, according to embodiments of the disclosure.

Embodiments of the disclosure show forming first and second nitride waveguides 130, 140 together. However, first and second nitride waveguides 130, 140 may be formed separately or together. As shown in FIG. 11, the method of forming waveguide structure 100 includes forming a trench 210 through ILD layer 120 in first region 102 of SOI substrate 112 under ILD layer 120. Trench 210 may extend at least partially into upper portion 206 of buried insulator layer 116 of SOI substrate 112 (where provided). In one non-limiting example, trench 210 may extend into buried insulator layer 0.02-0.5 micrometers (µm) for a 2 µm thick buried insulator layer 116. Trench 210 may also remove nitride cap 147 in at least part of region 102 (shown entirely removed for clarity). Alternatively, trench 210 may extend only into ILD layer 120, and not reach buried insulator layer 116. For purposes of illustration, only the former option is shown. Trench 210 may be formed using any now known or later developed opening techniques, as described herein. Trench 210 may have any desired dimensions. Notably, where desired, trench 210 may have a portion having a laterally tapered shape to form tapered portion 160 (FIG. 2) of waveguide 130.

Figure 12:
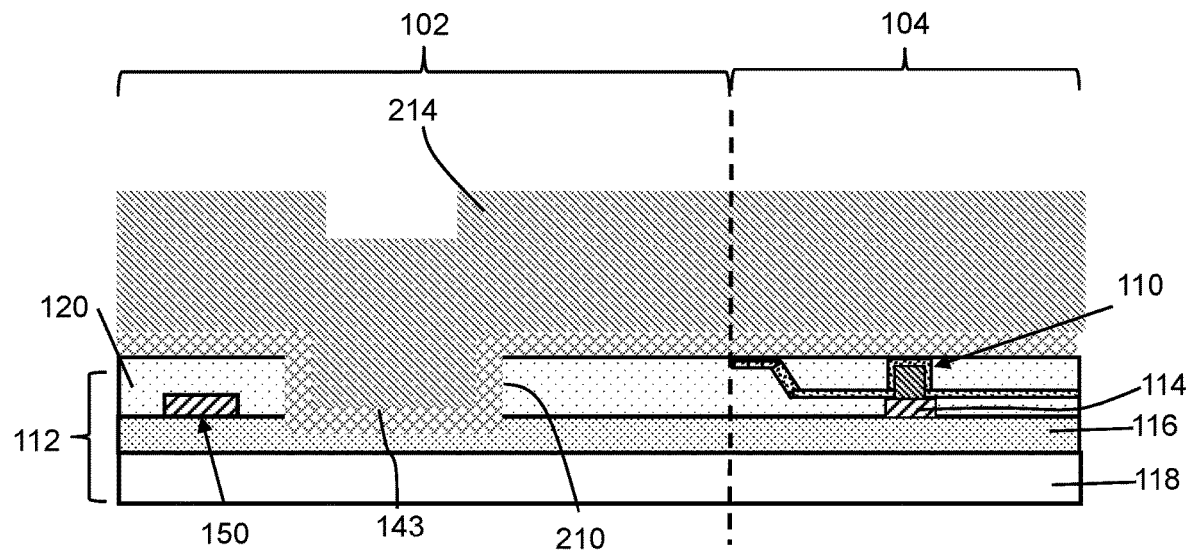
FIG. 12 shows a cross-sectional view of forming a nitride layer and a lower cladding layer for a lower surface of a first multilayer nitride waveguide and, where provided, a second multilayer nitride waveguide, according to embodiments of the disclosure.

FIG. 12 shows forming a lower cladding layer 143 and a nitride layer 214 over lower cladding layer 143 within trench 210 and over ILD 120. Lower cladding layer 143 and nitride layer 214 may be deposited using any appropriate technique for the materials listed herein, and multiple deposition steps may be performed. An upper surface of nitride layer 214 is then planarized. Planarization refers to various processes that make a surface more planar (that is, flattened and/or smoothened). Chemical-mechanical-polishing (CMP) is one currently conventional planarization process, which planarizes surfaces with a combination of chemical reactions and mechanical forces.

Figure 13:
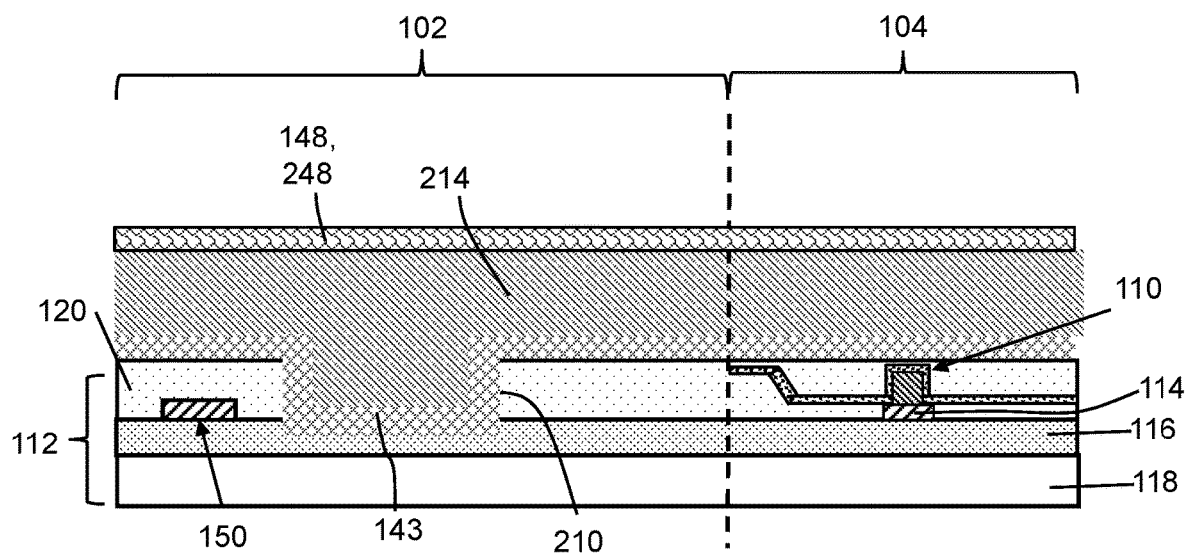
FIG. 13 shows a cross-sectional view of forming a nitride layer, a lower cladding layer for a lower surface and an upper cladding layer for an upper surface of a first multilayer nitride waveguide and, where provided, a second multilayer nitride waveguide, according to embodiments of the disclosure.

In an alternative embodiment, FIG. 13 shows forming a lower cladding layer 143 and a nitride layer 214 over lower cladding layer 143 within trench 210 and over ILD 120, and an optional upper cladding layer 148, 248 on an upper surface of nitride layer 214. The notation "148, 248" for the upper cladding layer indicates it may be the same material (i.e., 148) as lower cladding layer 143 on the lower surface of nitride bodies 131, 141, or a different cladding material (i.e., 248) than lower cladding layer 143 on the lower surface of nitride bodies 131, 141. (Note, the shading for the collective cladding layer 148, 248 is different than both cladding layers 148 or 248 in previous drawings). In any case, upper cladding layer 148, 248 may be deposited using any appropriate technique for the material, and multiple deposition steps may be performed. Any necessary planarization may occur prior to deposition, e.g., to remove undulations in nitride layer 214.

Figure 14:
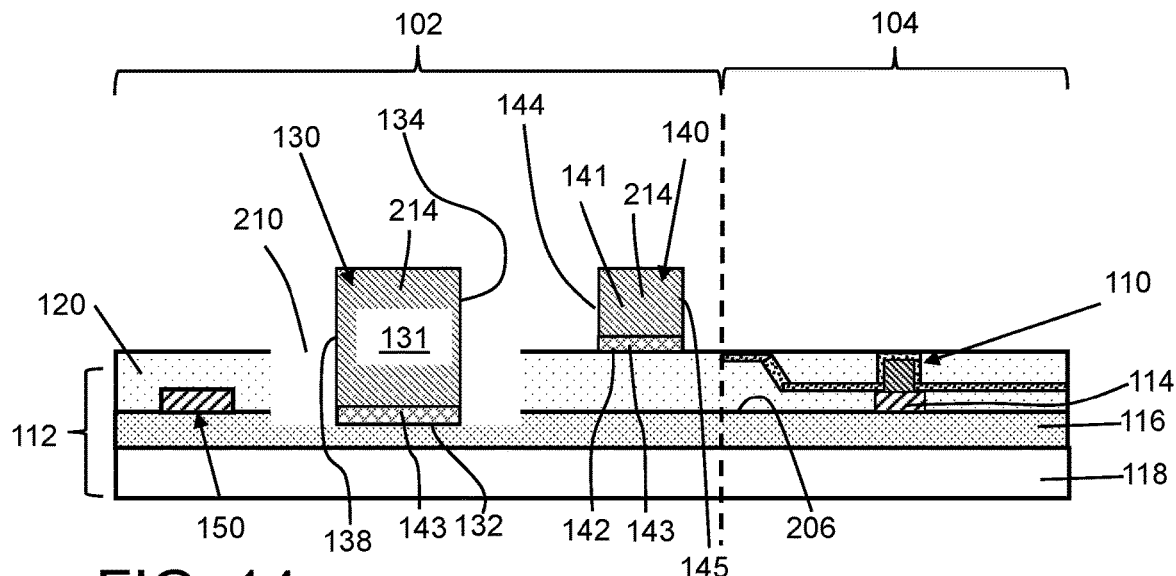
FIG. 14 shows a cross-sectional view of patterning the lower cladding layer and the nitride layer for a first multilayer nitride waveguide and, where provided, a second multilayer nitride waveguide based on the FIG. 12 embodiment.
Figure 15:
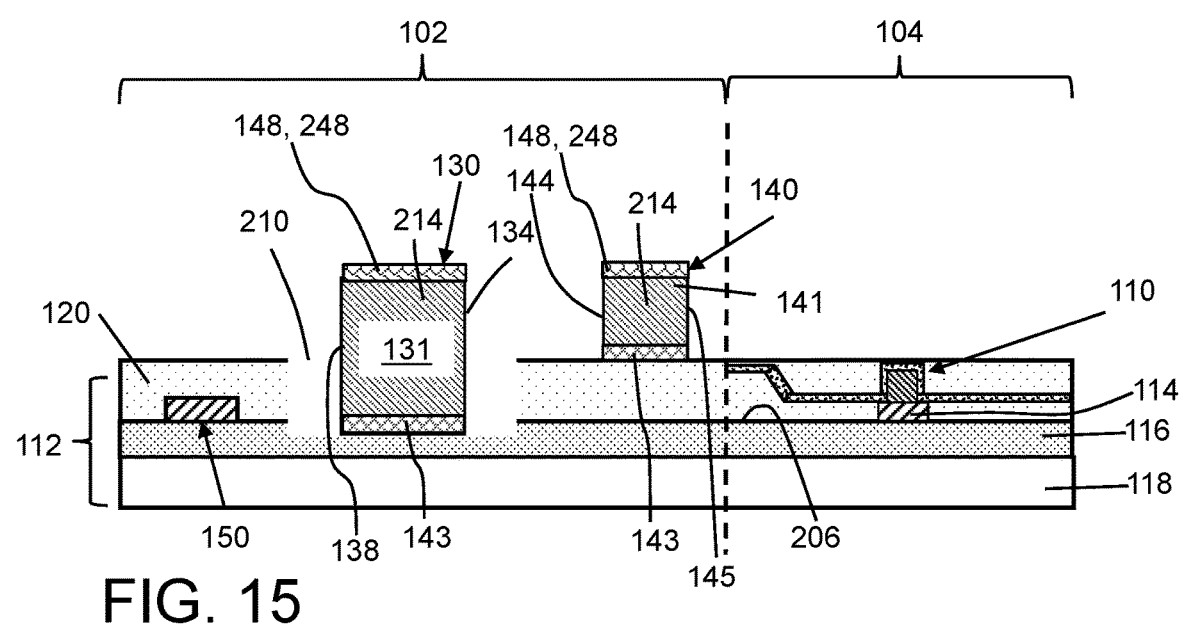
FIG. 15 shows a cross-sectional view of patterning the nitride layer and cladding layers for a first multilayer nitride waveguide and, where provided, a second multilayer nitride waveguide based on the FIG. 13 embodiment.

FIG. 14 shows forming first nitride waveguide 130 by patterning first cladding layer 143 and nitride layer 214 within trench 210 to form first nitride body 131 having first cladding layer 143 thereunder. The patterning may include any now known or later developed lithography and etching of lower cladding layer 143 and nitride layer 214, i.e., to shape the desired structures to desired dimensions, based on the FIG. 12 embodiment. The etching in FIG. 14 forms first nitride body 131 and lower cladding layer 143 on a lower surface thereof. This process may also include forming second nitride waveguide 140 by patterning lower cladding layer 143 and nitride layer 214 over ILD layer 120 and outside trench 210 to form a second nitride body 141 having lower cladding layer 143 thereunder. In an alternative embodiment, FIG. 15 shows lithography and etching of lower cladding layer 143, nitride layer 214 and upper cladding layer 148, 248, i.e., to shape the desired structures to desired dimensions, based on the FIG. 13 embodiment. As noted, lower cladding layer 143 has a lower refractive index than second nitride body 141. The etching in FIG. 15 forms first nitride body 131, lower cladding layer 143 on a lower surface thereof and upper cladding layer 148, 248 on upper surface thereof. The etching in FIG. 15 also forms second nitride body 141, lower cladding layer 143 on a lower surface thereof, and cladding layer 148, 248 on an upper surface thereof. In either case, the etching may include, for example, a RIE with a mask (not shown). In contrast to the drawings, if second nitride waveguide 140 is not required, the etching can remove lower cladding layer 143, nitride layer 214 and, if provided, second cladding layer 148, 248, from over ILD 120 where second nitride waveguide 140 is illustrated, i.e., by leaving that area exposed. In any event, first nitride body 141 has a larger vertical dimension than second nitride body 141.

Figure 16:
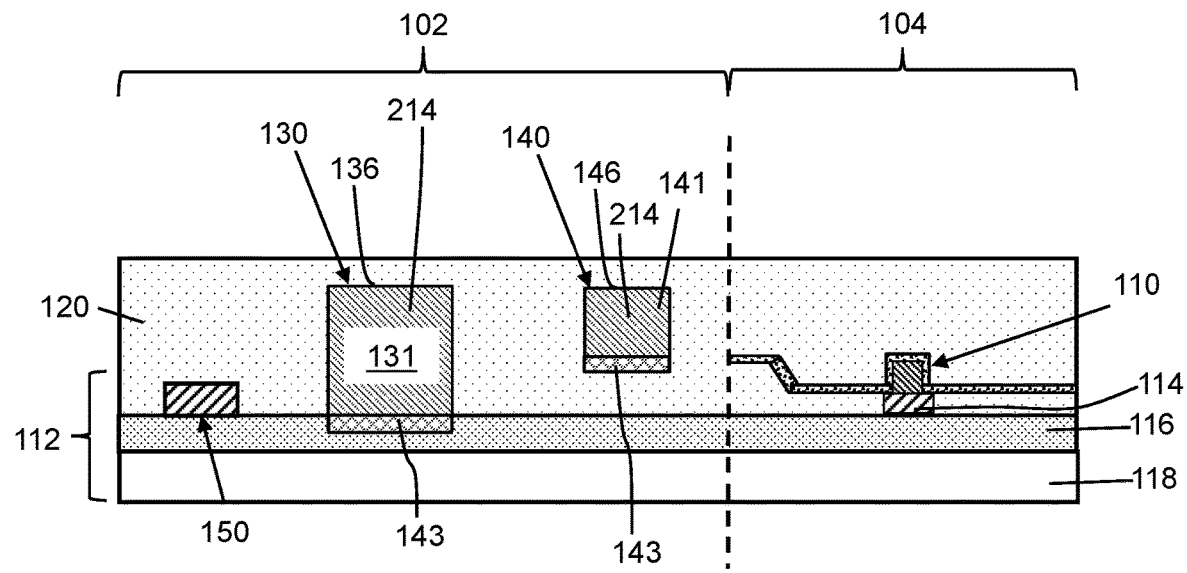
FIG. 16 shows a cross-sectional view of forming an interlayer dielectric based on the FIG. 14 embodiment.
Figure 17:
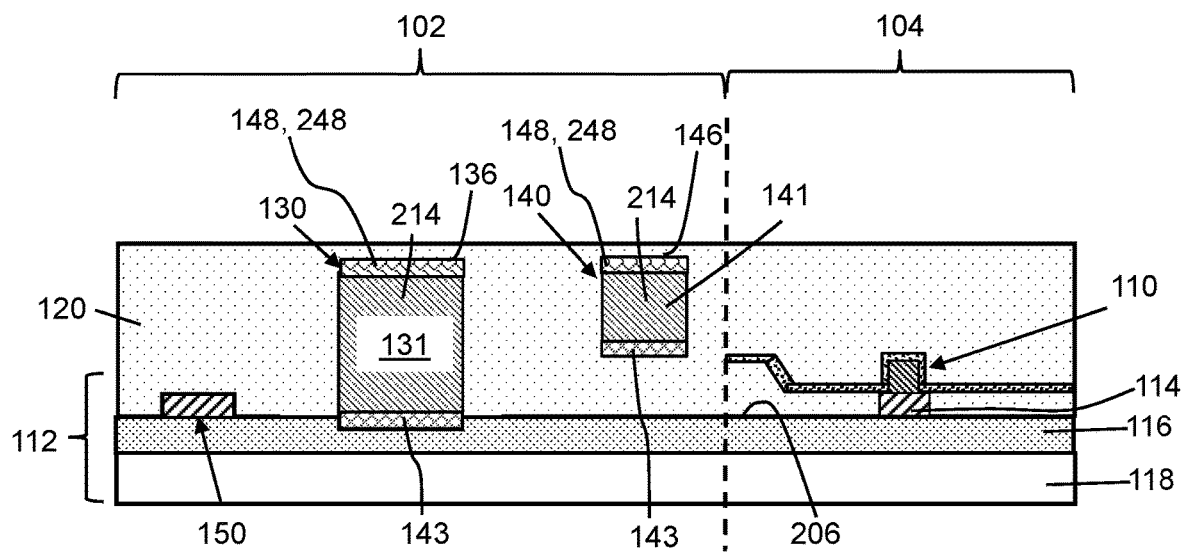
FIG. 17 shows a cross-sectional view of forming an interlayer dielectric based on the FIG. 15 embodiment.

FIG. 16 shows processing of refilling ILD layer 120, i.e., into trench 210, based on the FIG. 14 embodiment. FIG. 17 shows processing after refilling ILD layer 120, i.e., into trench 210, based on the FIG. 15 embodiment. The refilling may include, for example, gap filling about nitride layer 214, planarizing upper surfaces 136, 146 of nitride layer 214 or upper cladding layer 148, 248, and forming a topping layer of ILD layer 120. Upper surfaces 136, 146 of first nitride waveguide 130 and second nitride waveguide 140 (where provided) remain within ILD layer 120.

Returning to FIGS. 1, 4 and 5, the figures show processing after refilling ILD layer 120, thus forming/finalizing both first and second nitride waveguides 130, 140 based on the FIGS. 16 and 17 embodiments. After the gap filling, but prior to the formation of additional topping layer(s) of ILD 120 and planarizing thereof, a planarizing can make upper surfaces 136, 146 of first and second nitride waveguides 130, 140 coplanar (FIGS. 1, 4 and 5), regardless of whether upper surface(s) 136, 146 includes the nitride of the nitride bodies of the waveguides, upper cladding layer 148 or upper cladding layer 248. Alternatively, the planarization may not extend far enough to make upper surfaces 136, 146 of first and second nitride waveguides 130, 140 planar (FIGS. 1, 4 and 5), and they may remain non-coplanar. In any event, upper surfaces 136, 146 of first and second nitride waveguides 130, 140 are within ILD layer(s) 120. FIGS. 1, 4 and 5 also show first nitride waveguide 130 having a larger vertical dimension, i.e., thickness T1, than second nitride waveguide 140. As noted, first and second nitride waveguides 130, 140 are optically side-coupled. At this stage, interconnects 122 may be formed in ILD 120, and any back-end-of-line interconnect layers 124 can be formed using known techniques.

Figure 18:
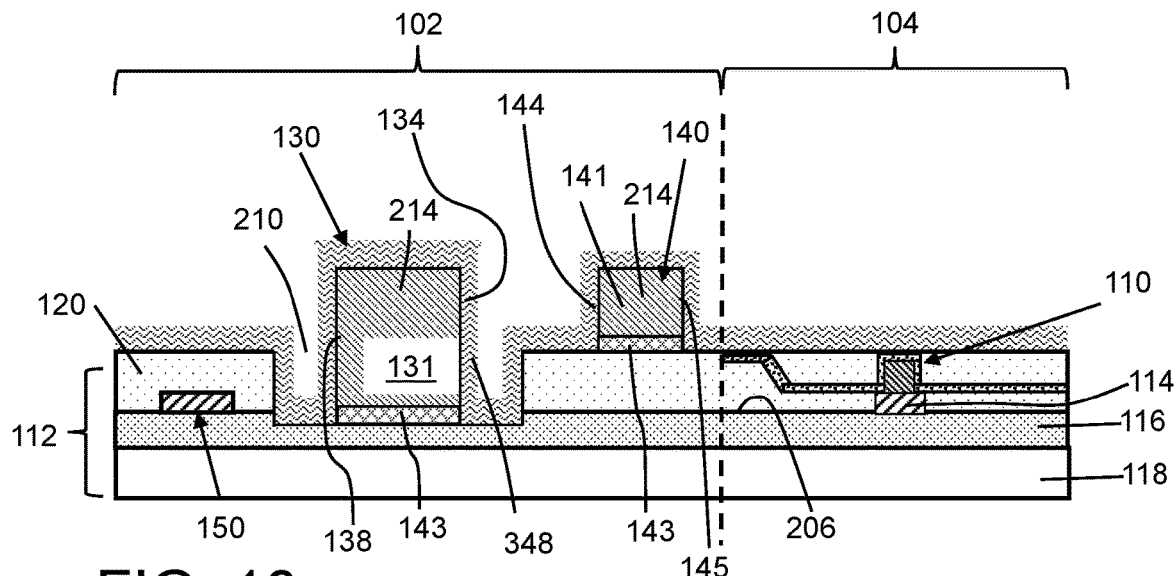
FIG. 18 shows a cross-sectional view of forming a side cladding layer based on the FIG. 14 embodiment.
Figure 19:
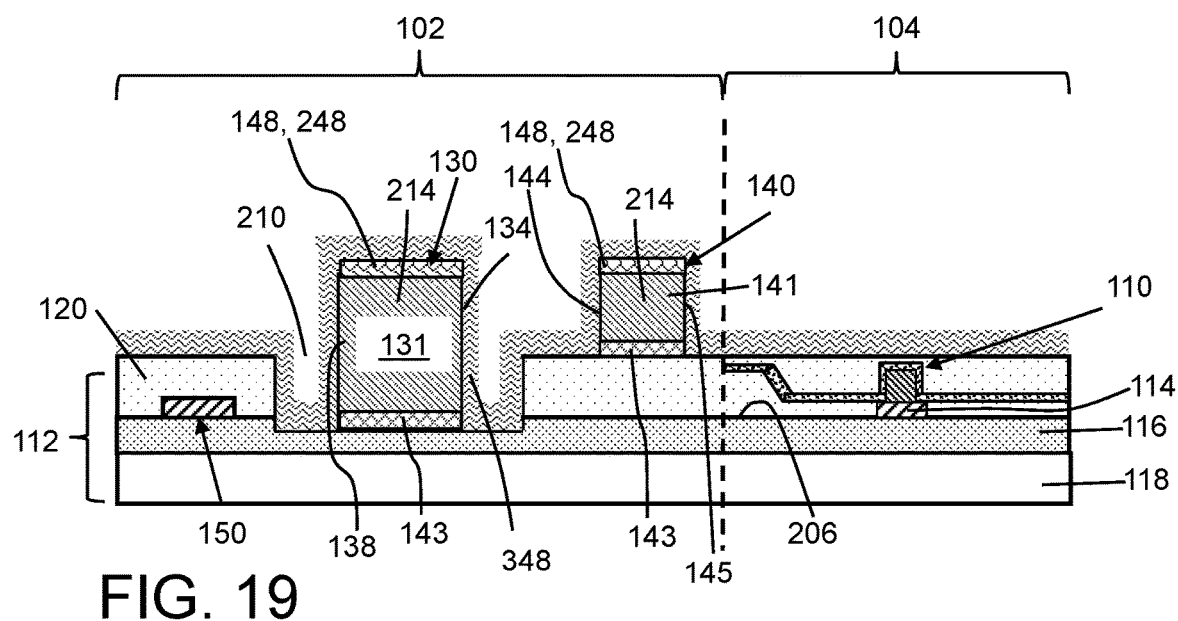
FIG. 19 shows a cross-sectional view of forming a side cladding layer based on the FIG. 15 embodiment.

Returning to FIGS. 14-15 and with reference to FIG. 18, FIG. 18 shows forming side cladding layer 348 on at least one of a sidewall 134, 138 of first nitride body 131 and a sidewall 144, 145 of second nitride body 141. FIG. 18 is based on the FIG. 14 embodiment. FIG. 19 also shows forming side cladding layer 348 on at least one of a sidewall 134, 138 of first nitride body 131 and a sidewall 144, 145 of second nitride body 141. FIG. 19 is based on the FIG. 15 embodiment. Side cladding layer 348 may be deposited using any appropriate technique for the materials listed herein, and multiple deposition steps may be performed. Side cladding layer 348 has a lower refractive index than first nitride body 131 and second nitride body 141 and is of a different material than upper cladding layer(s) 148, 248.

Figure 20:
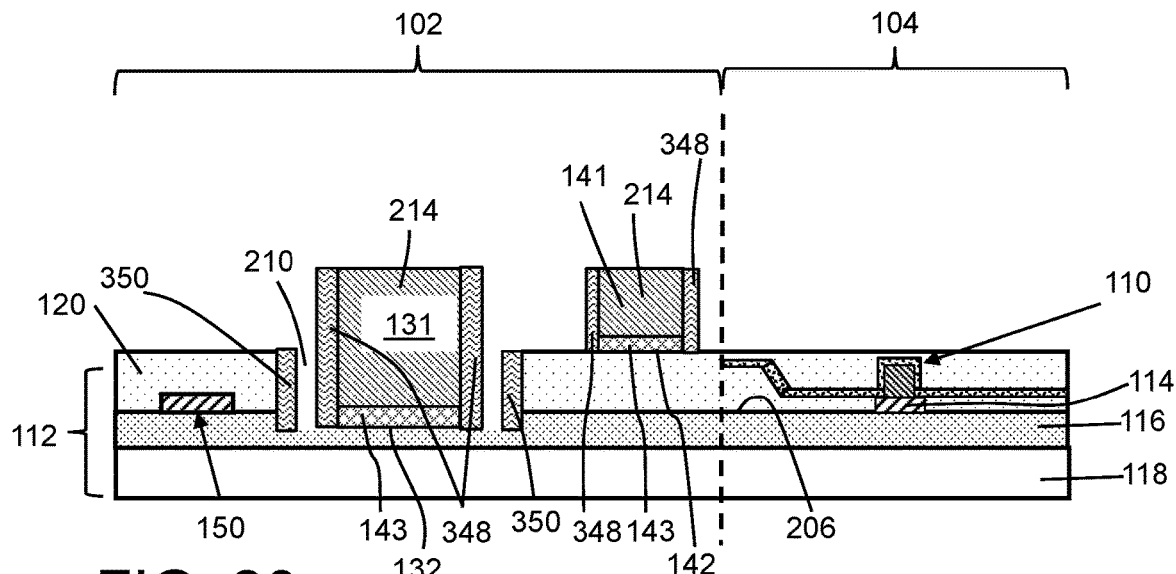
FIG. 20 shows a cross-sectional view of forming a side cladding layer on a sidewall of the first multilayer nitride waveguide and, where provided, the second multilayer nitride waveguide based on the FIG. 18 embodiment.
Figure 21:
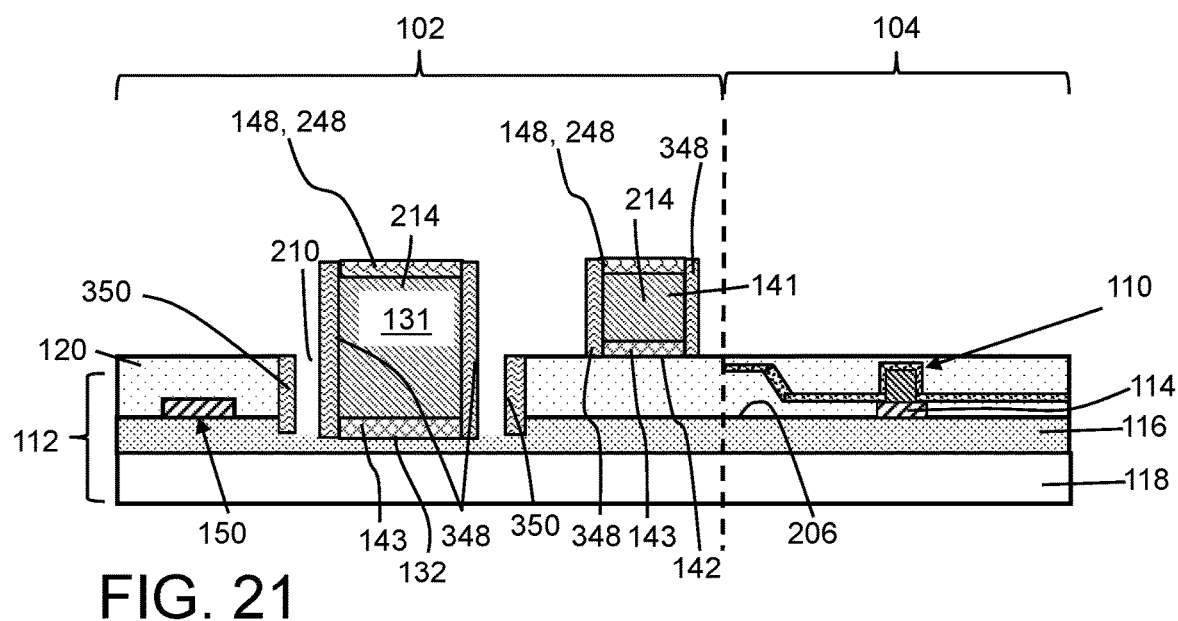
FIG. 21 shows a cross-sectional view of forming a side cladding layer on a sidewall of the first multilayer nitride waveguide and, where provided, the second multilayer nitride waveguide based on the FIG. 19 embodiment.

FIGS. 20 and 21 show etching back side cladding layer 348 of FIGS. 18 and 19, respectively. The etch back may include any appropriate chemistry for side cladding layer 348 material, e.g., a directional etching. As shown in FIGS. 20 and 21, at least one segment 350 of side cladding layer 348 (FIGS. 18-19) remains laterally spaced from lower surface 132 or end of first nitride waveguide 130. Segments 350 are on lateral ends of trench 210.

Returning to FIGS. 6 and 7, the figures show processing after refilling ILD layer 120, thus forming/finalizing both first and second nitride waveguides 130, 140 based on the FIG. 21 embodiment. The refilling, as shown in FIGS. 6 and 7, may include, for example, gap filling (e.g., with a gap fill oxide) about cladding layers 148, 248 and/or 348 (FIG. 21). The gap fill oxide may become part of ILD layer 120 and/or additional topping layer(s) of ILD layer 124 may be formed. ILD layer(s) 120, 124 include different material than cladding layers 143, 148, 248, 348. In any event, an upper surface of ILD layer(s) 120 (FIGS. 6-7) is planarized, e.g., using chemical mechanical polishing (CMP). After the gap filling, but prior to the formation of additional topping layer(s) of ILD 120 and/or 124 and planarizing thereof, a planarizing can make upper surfaces 136, 146 of first and second nitride waveguides 130, 140 coplanar (FIGS. 6-7), regardless of whether upper surface(s) 136, 146 includes the nitride of the nitride bodies 131, 141, upper cladding layer 148 or upper cladding layer 248. Alternatively, the planarization may not extend far enough to make upper surfaces 136, 146 of first and second nitride waveguides 130, 140 planar (FIGS. 6-7), and they may remain non-coplanar. In any event, upper surfaces 136, 146 of first and second nitride waveguides 130, 140 are within ILD layer(s) 120. FIGS. 6-7 also show first nitride waveguide 130 having a larger vertical dimension, i.e., thickness T1, than second nitride waveguide 140. FIG. 6-7 also show at least one segment 350 of side cladding layer 348 is laterally spaced from lower surface 132 or end of first nitride waveguide 130. As noted, first and second nitride waveguides 130, 140 are optically side-coupled. At this stage, interconnects 122 may be formed in ILD 120, and any back-end-of-line interconnect layers 124 can be formed using known techniques.

With further regard to FIGS. 18-21, it will be recognized that the processes described can be carried out with side cladding layer 348 including the same material as lower cladding layer 143 and upper cladding layer 148 (where provided, see FIGS. 19 and 21), so all the cladding layers include the same material. FIG. 8 shows similar processes as described relative to FIGS. 6-7, but cladding layers 143, 148 and 348 are the same material. FIG. 9 shows similar processes as described relative to the FIGS. 6-7 embodiments, but occurring from the FIG. 20 embodiment. In FIG. 9, although shown as the same material, cladding layers 143 and 348 may be the same or different materials, and second cladding layer 148 is omitted.

Embodiments of the disclosure provide various technical and commercial advantages, examples of which are discussed herein. As noted, embodiments of the disclosure provide structures and methods having an enlarged multilayer nitride waveguide and a smaller multilayer nitride waveguide. One or more of the multilayer waveguides may include a cladding layer have a lower refractive index than the waveguide(s) on at least a lower surface the waveguide(s). The multilayer waveguides enable monolithic integration of ultra-low propagation loss waveguides, perhaps with silicon waveguides and/or CMOS devices. The cladding layer(s) reduce propagation losses, allow changing of the mode shape within the waveguide, and allow shorter directional coupling (relaxing fabrication requirements) between the waveguides. The multilayer waveguides further enable monolithic integration of ultra-low-loss, large-size nitride waveguides with, for example, silicon waveguides and CMOS devices, allowing full realization of the benefit of ultra-low-loss nitride devices and photonic integrated circuits. The enlarged multilayer waveguide is also less sensitive to fabrication variations than existing nitride waveguides and can handle higher optical power.

The method as described above is used in the fabrication of photonic integrated circuit chips. The resulting photonic integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A structure, comprising:
an inter-level dielectric (ILD) layer over a substrate; and
a first multilayer nitride waveguide positioned in the ILD layer in a first region of the substrate, the first multilayer nitride waveguide including:
a first nitride body,
a first cladding layer on at least a lower surface of the first nitride body, wherein the first cladding layer has a lower refractive index than the first nitride body, and
a second cladding layer on a sidewall of the first nitride body, the second cladding layer having a lower refractive index than the first nitride body and being of a different material than the first cladding layer, wherein a segment of the second cladding layer is laterally spaced from a lower surface of the first multilayer nitride waveguide.

2. The structure of claim 1, wherein the first cladding layer is selected from a group comprising: zinc monoxide (ZnO); aluminum oxide ($Al_2O_3$); magnesium oxide (MgO); silicon dioxide ($SiO_2$); calcium fluoride ($CaF_2$); octamethylcyclotetrasiloxane; and magnesium fluoride.

3. The structure of claim 1, further comprising a second multilayer nitride waveguide in the ILD layer in the first region of the substrate, wherein the first and second multilayer nitride waveguides are optically side-coupled to one another; and
wherein the second multilayer nitride waveguide includes a second nitride body, and the first cladding layer is also on a lower surface of the second nitride body, and wherein the first cladding layer has a lower refractive index than the second nitride body.

4. The structure of claim 3, wherein the first multilayer nitride waveguide has a thickness of greater than 500 nanometers (nm), and the second multilayer nitride waveguide has a thickness of less than 500 nm.

5. The structure of claim 3, wherein the first cladding layer is also on an upper surface of the first nitride body and the second nitride body.

6. The structure of claim 3, further comprising a second cladding layer on an upper surface of at least one of the first nitride body and the second nitride body, the second cladding layer having a lower refractive index than the first and second nitride bodies.

7. The structure of claim 6, further comprising a third cladding layer on a sidewall of at least one of the first nitride body and the second nitride body, the third cladding layer having a lower refractive index than the first and second nitride bodies, and
further comprising at least one segment of the third cladding layer laterally spaced from a lower surface of the first multilayer nitride waveguide.

8. The structure of claim 1, further comprising a complementary metal-oxide semiconductor (CMOS) device in a second region of the substrate, wherein the ILD layer is over the CMOS device and includes interconnects to the CMOS device.

9. A structure, comprising:
a semiconductor-on-insulator (SOI) substrate including a semiconductor-on-insulator (SOI) layer over a buried insulator layer over a semiconductor substrate;
an inter-level dielectric (ILD) layer over the SOI substrate;
a first multilayer nitride waveguide positioned in the ILD layer in a first region of the SOI substrate, the first multilayer nitride waveguide including a first nitride body, and a first cladding layer on at least a lower surface of the first nitride body, wherein the first cladding layer has a lower refractive index than the first nitride body; and
a second multilayer nitride waveguide in the ILD layer in the first region of the SOI substrate, wherein the first and second multilayer nitride waveguides are optically side-coupled to one another, the second multilayer nitride waveguide including a second nitride body, and the first cladding layer on at least a lower surface of the second nitride body, wherein the first cladding layer has a lower refractive index than the second nitride body.

10. The structure of claim 9, wherein the first cladding layer is selected from a group comprising: zinc monoxide (ZnO); aluminum oxide ($Al_2O_3$); magnesium oxide (MgO); silicon dioxide ($SiO_2$); calcium fluoride ($CaF_2$); octamethylcyclotetrasiloxane; and magnesium fluoride.

11. The structure of claim 9, wherein the first multilayer nitride waveguide has a thickness of greater than 500 nanometers (nm), and the second multilayer nitride waveguide has a thickness of less than 500 nm.

12. The structure of claim 9, wherein the first cladding layer is on an upper surface of at least one of the first nitride body and the second nitride body.

13. The structure of claim 9, further comprising a second cladding layer on an upper surface of at least one of the first nitride body and the second nitride body, the second cladding layer having a lower refractive index than the first and second nitride bodies.

14. The structure of claim 13, further comprising a third cladding layer on a sidewall of at least one of the first nitride body and the second nitride body, the side cladding layer having a lower refractive index than the first and second nitride bodies, and further comprising at least one segment of the third cladding layer laterally spaced from a lower surface of the first multilayer nitride waveguide.

15. The structure of claim 9, further comprising a second cladding layer on a sidewall of the first nitride body, the second cladding layer having a lower refractive index than the first nitride body and being of a different material than the first cladding layer, and wherein at least one segment of the second cladding layer is laterally spaced from a lower surface of the first multilayer nitride waveguide.

16. A method of forming a waveguide structure, the method comprising:

forming a trench through an inter-level dielectric (ILD) layer in a first region of a substrate under the ILD layer;

forming a first cladding layer and a nitride layer over the first cladding layer within the trench and over the ILD layer;

planarizing an upper surface of the nitride layer, wherein the upper surface of the nitride layer remains within the ILD layer; and forming a first multilayer nitride waveguide by patterning the first cladding layer and the nitride layer within the trench to form a first nitride body having the first cladding layer thereunder, wherein the first cladding layer has a lower refractive index than the first nitride body.

17. The method of claim 16, further comprising forming a second multilayer nitride waveguide by patterning the first cladding layer and the nitride layer over the ILD layer and outside the trench to form a second nitride body having the first cladding layer thereunder, wherein the first nitride body has a larger vertical dimension than the second nitride body, wherein the first and second multilayer nitride waveguides are optically side-coupled, and wherein the first cladding layer has a lower refractive index than the second nitride body.

18. The method of claim 17, further comprising forming a second cladding layer on an upper surface of at least one of the first nitride body and the second nitride body.

19. The method of claim 18, further comprising forming a third cladding layer on a sidewall of at least one of the first nitride body and the second nitride body.

* * * * *